US006928729B2

(12) United States Patent
Britt et al.

(10) Patent No.: US 6,928,729 B2
(45) Date of Patent: Aug. 16, 2005

(54) CYLINDER HEAD AND CRANKCASE MANUFACTURING AND ASSEMBLY TECHNIQUES

(75) Inventors: Alan Britt, Talladega, AL (US); James L. Bloemers, Nashville, AR (US); Elmer R. Ford, Nashville, AR (US)

(73) Assignee: Electrolux Home Products, Inc., Cleveland, OH (US)

( * ) Notice: Subject to any disclaimer, the term of this patent is extended or adjusted under 35 U.S.C. 154(b) by 16 days.

(21) Appl. No.: 10/718,463

(22) Filed: Nov. 20, 2003

(65) Prior Publication Data

US 2004/0098860 A1 May 27, 2004

(Under 37 CFR 1.47)

Related U.S. Application Data

(62) Division of application No. 09/932,532, filed on Aug. 17, 2001, now Pat. No. 6,842,978.

(51) Int. Cl.[7] .................................................. B23P 11/00

(52) U.S. Cl. ................................ 29/888.06; 29/898.07; 29/898.09; 74/606 R; 123/196 CP

(58) Field of Search ................. 74/606 R; 123/196 CP; 29/888, 888.01, 888.06, 898.07, 898.09

(56) References Cited

U.S. PATENT DOCUMENTS 3,532,402 A * 10/1970 Templeton et al. ......... 384/557
3,772,946 A 11/1973 Sarra
3,844,334 A 10/1974 Frederickson
4,228,210 A * 10/1980 Scribner ...................... 428/131
4,429,927 A * 2/1984 Kawabata ................... 384/585
4,653,161 A 3/1987 Sanchez
4,969,263 A 11/1990 Adams
5,059,042 A * 10/1991 Grierson ...................... 384/537
5,527,115 A * 6/1996 Zepp et al. ................. 384/537
6,041,499 A 3/2000 Matsuura et al.

FOREIGN PATENT DOCUMENTS

DE 199 24 887 A 12/2000

OTHER PUBLICATIONS

Patent Abstracts of Japan, Publication No. 60148657, published Aug. 5, 1985.

Patent Abstracts of Japan, Publication No. 58025861, published Feb.16, 1983.

* cited by examiner

*Primary Examiner*—Eric Compton
(74) *Attorney, Agent, or Firm*—Pearne & Gordon LLP

(57) ABSTRACT

A method of manufacturing a cylinder head and crankcase for a small engine. A crankcase and a cylinder head are cast to close tolerances and include as-cast mounting flanges, which are assembled in face-to-face contact by employing self-threading screws. Bearing recesses are cast into the crankcase. The cylindrical sidewalls of the bearing recesses are provided with as-cast flutes and roller bearings are press-fitted into the bearing recesses.

7 Claims, 10 Drawing Sheets

CYLINDER HEAD AND CRANKCASE MANUFACTURING AND ASSEMBLY TECHNIQUES

This application is a divisional of U.S. application Ser. No. 09/932,532, now U.S. Pat. No. 6,842,978 filed Aug. 17, 2001.

BACKGROUND OF THE INVENTION

The invention relates to single-piston, two-cycle gasoline engines and more particularly, techniques for eliminating certain prior art machining operations performed on cylinder head and crankcase castings.

Current manufacturing techniques involve casting a cylinder block and a crankcase using a die-casting process utilizing standard casting tolerances that are relatively broad. The cast cylinder and crankcase go through numerous machining steps to arrive at the finished product, ready to be assembled together, and with additional engine parts, into a completed engine.

Traditionally, a typical die casting process employs "standard casting tolerances", which are known as "steel safe". "Steel safe" means that the core pins that are used to produce holes-in a part are on the high side of broad tolerances so that as wear occurs on them, they would nevertheless remain in tolerance. Die details that create the outside surface of the casting are dimensioned on the low side of the broad tolerance so that wear on the die allows the resultant part to remain in print tolerance. This allows a die to produce large quantities of parts with little attention paid to the dimensional integrity of the parts, resulting in a low maintenance cost.

At least in the manufacture of cylinder blocks and crankcases for single-piston, two-cycle gasoline engines, these savings are illusory in that mating surfaces, such as the mating surface between the block and the crankcase, must be machined. Also, the broad tolerance core pin openings must be drilled and tapped to receive the fasteners for these parts. Further, the crankshaft bearing portal must be machined to a press tolerance and machined to accommodate bearing locator snap rings. All of these machining operations require labor and equipment costs, which negate any savings in employing standard casting tolerances.

In addition to the cost factors involved in machining the foot area of the cylinder head and the mating area of the crankcase to ensure a proper seal, the machining operation itself contributes to exhaust gas leaks in the casting. All aluminum die castings are inherently porous. However, the initially chilled surface of the casting provides a dense skin, which seals the porous interior of the casting. When this skin is machined to provide precise gasket mating surfaces between the cylinder block and crankcase, the dense skin is removed and exhaust leakage is permitted through the gasket area.

Analyzing the costs of the traditional machining operations, including the costs of the machine tools, the labor involved in operating the machine tools, the time loss due to the number of steps involved, and the risks of poor quality due to potential errors that the large number of operations required can cause led to the realization that by requiring tighter tolerances on the die mold and its components, one could decrease the total cost of the manufacturing process despite the increased die mold and maintenance costs and the decreased die mold life.

SUMMARY OF THE INVENTION

According to this invention, no machining operations are required in the foot flange area between the cylinder block and the crankcase. The die caster is required to hold tighter tolerances in respect to flange flatness and surface finish, as well as the fastener hole diameters and true positional location of those diameters.

The preferred tolerances are:

Flange flatness=0.006 inch over the entire surface of the flange

Perpendicularity of flange holes to the flange=0.002 inch

True positional location of the flange holes=0.006 inch

The cylinder block flange mates with a crankcase flange, which also is die-cast to the same tight tolerances, and an O-ring is provided in a groove in the crankcase flange. The O-ring and the unmachined flange surfaces provide a reliable seal between the flange surfaces and, since the fastener openings or holes are cast to tight tolerances, self-tapping screws may be used to attach the cylinder block to the crankcase, thus eliminating the need for drill and tap operations.

This invention also provides for an improved bearing mount for the crankshaft. The crankcase is die-cast, with bearing seats having a plurality of radially inwardly directed flutes. The bearings are press fitted into the seats. Even though press fit tolerances are not as precise as machined tolerances, the as cast flutes create spaces for material displacement during the bearing pressing operation. The flutes also allow for a radial bending of the surrounding casting material during the pressing operation rather than a circumferential stretch, as occurs when the casting is machined for a press fit.

Since a pair of roller bearing units are provided for the crankshaft, a pair of bearing seats are provided with each bearing seat extending inwardly from each end of the crankshaft portal in the crankcase casting. The base of each bearing seat is defined by an annular seat, which locates the bearing during the press fitting operation. This eliminates the need for machined grooves and locating clips in the driveshaft portal.

DETAILED DESCRIPTION OF THE INVENTION

Figure 1:
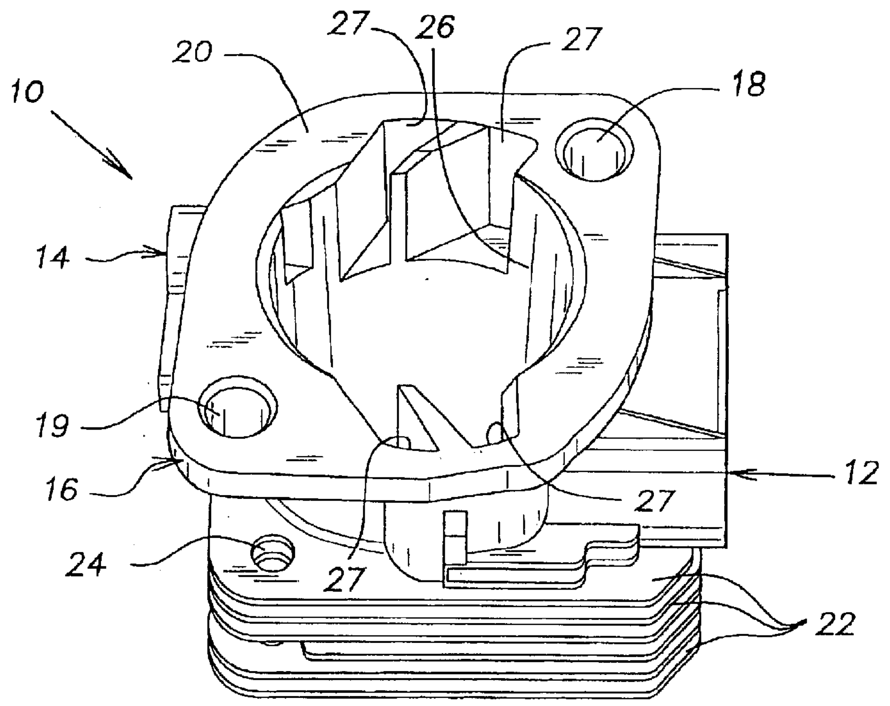
FIG. 1 is a perspective view of a cylinder block according to this invention.
Figure 2:
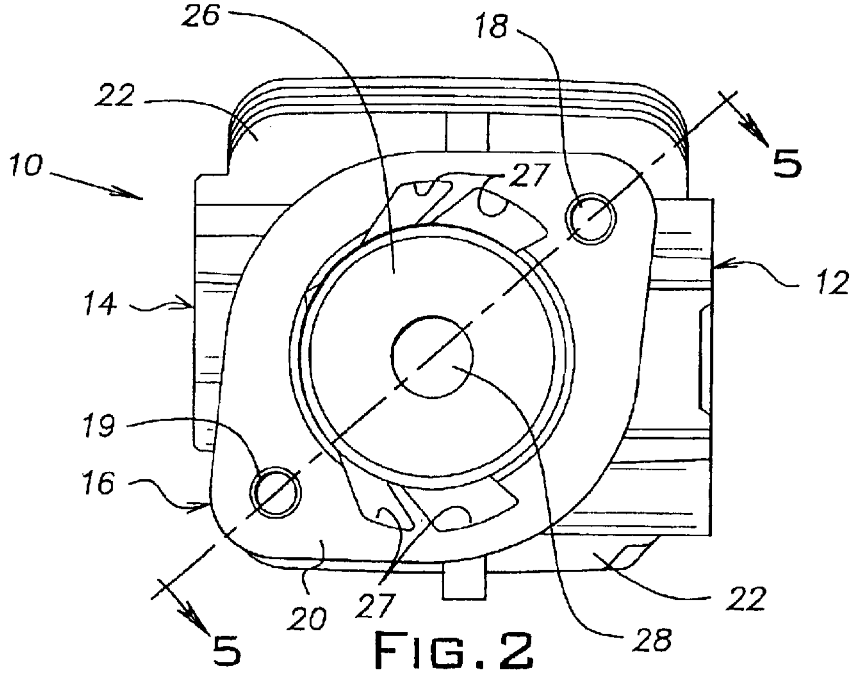
FIG. 2 is a plan view of the cylinder block shown in FIG. 1.
Figure 3:
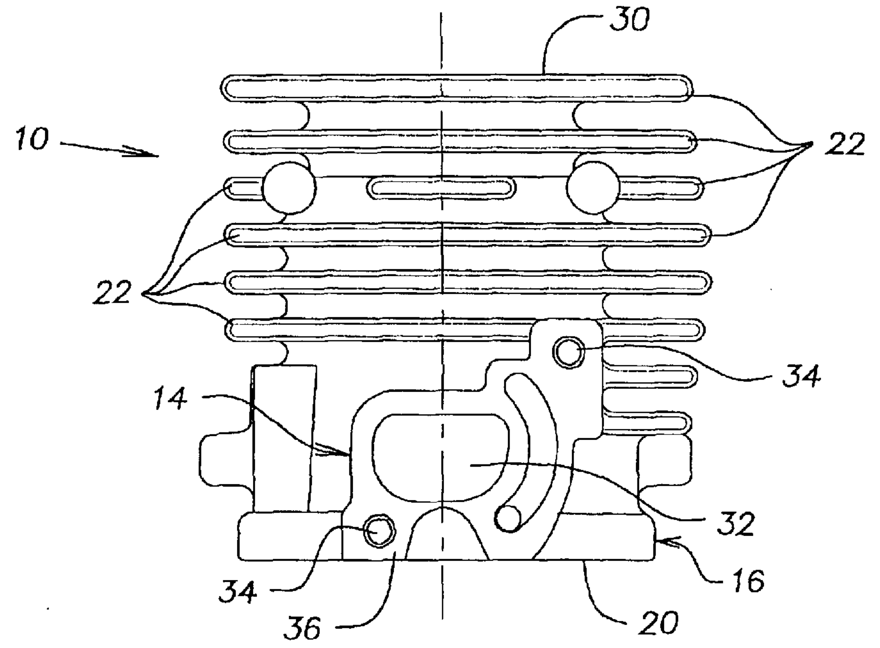
FIG. 3 is an elevational view of the cylinder block, viewed from the air-fuel intake side.
Figure 4:
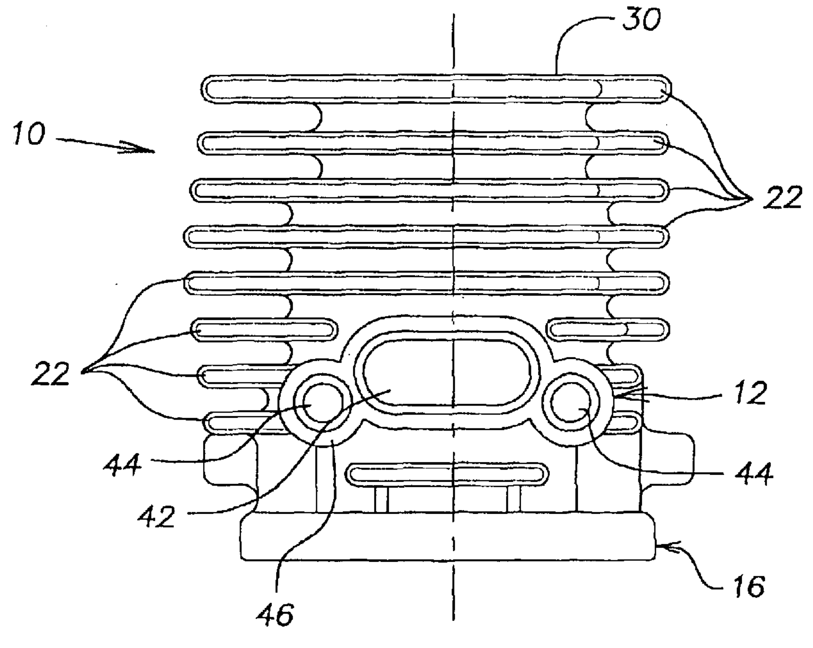
FIG. 4 is an elevational view of the cylinder block viewed from the exhaust port side.
Figure 5:
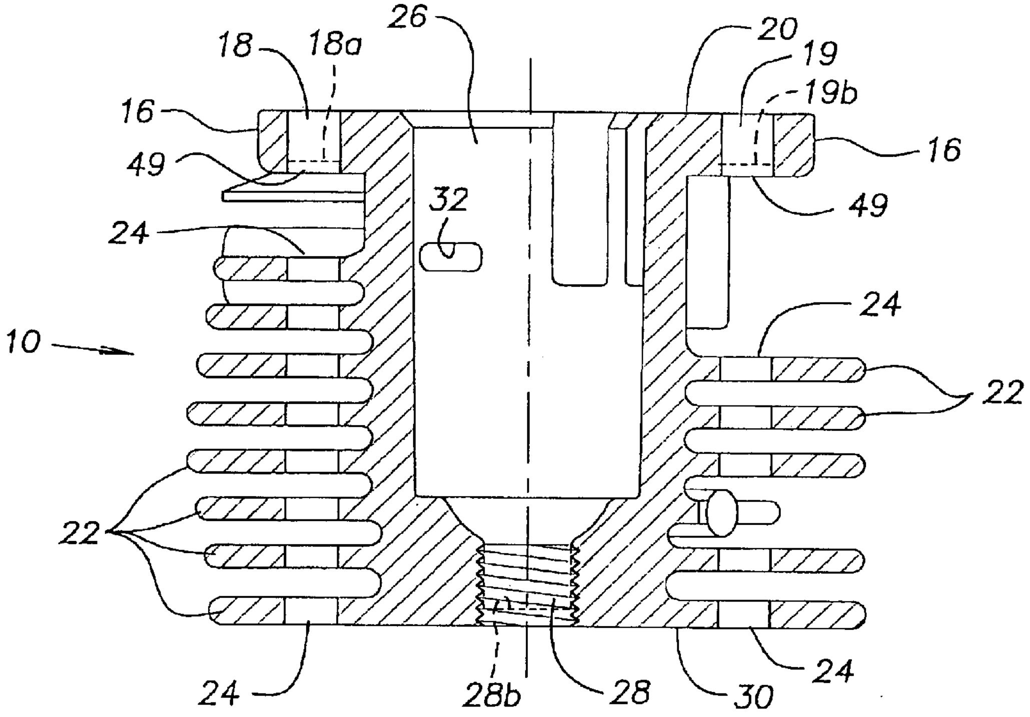
FIG. 5 is a cross-sectional view, the plane of the section being indicated by the line 5—5 in FIG. 2.

Referring now to the drawings, and particularly to FIGS. 1–5, there is illustrated a cylinder block 10 according to this invention. The cylinder block 10 has an intake port flange 14, an exhaust port flange 12, and a foot flange 16 at the bottom of the cylinder block 10. The foot flange 16 is adapted to be connected to a crankcase connecting flange, as will become apparent. First and second fastener openings 18 and 19 are die-cast in the cylinder block 10 under close tolerances. Fins 22 are provided on the cylinder block 10 to cool the block during operation.

The cylinder block 10 is cast with a flange mounting surface 20 having an as cast flatness of approximately 0.006 inches. As will become apparent, this provides a sealing surface that eliminates the prior art machining step. Elimination of the machining step on the surface 20 also eliminates the removal of the as-cast skin, which selves as a seal against leakage through the relatively porous interior of the casting.

The cylinder block 10 also is provided with axially aligned openings 24 through the Fins 22 to provide tool access to the fastener openings 18 and 19. The openings 24 are preferably as-cast openings formed by core pins in the mold. Still further, the cylinder block 10 is provided with a piston cylinder chamber 26, a threaded spark plug opening 28, and scavenging ports 27. An exhaust port 42 extends from the cylinder chamber 26 to a face 46 of the exhaust port flange 12 of the block 10. Fastener openings 44 are cast into the face 46 by mold core pins (not shown). The opposite side of the cylinder block 10 is provided with an intake port 32 extending from the cylinder 26 to a face 36 of the intake port flange 14 of the block 10. Fastener openings 34 are cast into the face 36 by mold core pins (not shown).

Figure 6:
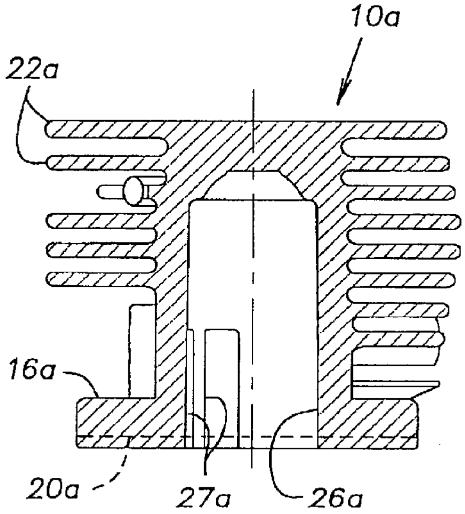
FIG. 6 PRIOR ART
FIGS. 6–9 are cross-sectional views that progressively illustrate various machining operations performed on a cylinder block according to prior art practices.
Figure 7:
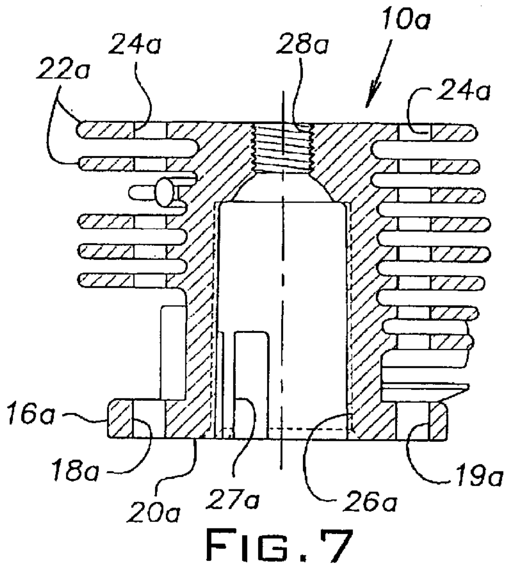
FIG. 7 PRIOR ART
Figure 8:
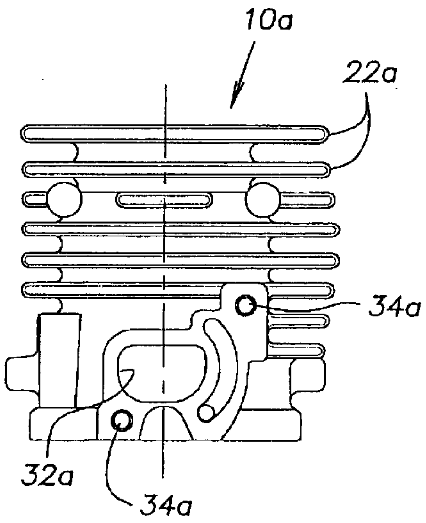
FIG. 8 PRIOR ART
Figure 9:
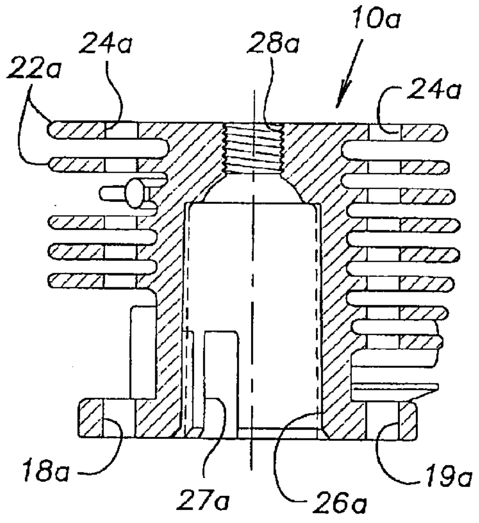
FIG. 9 PRIOR ART

Referring now to FIGS. 6–9, a series of prior art machining operations that are accomplished at three separate machining stations are illustrated. In FIG. 6, a die-cast engine block 10*a* is die-cast to broad tolerances and positioned at a first machining station. The piston block 10*a* is cast with a plurality of cooling fins 22*a,* a piston chamber 26*a,* scavenging ports 27*a,* an intake port 32*a* (FIG. 8), and an exhaust port (not shown). At the first machining station, a flange mounting surface 20*a* of a foot flange 16*a* is machined to close tolerances as is indicated by the phantom line in FIG. 6.

After the mounting surface 20*a* is machined at the first machining station, the cylinder block 10*a* is transferred to a second machining station (FIG. 7) where fastener openings 18*a* and 19*a* are drilled in the flange 16*a* and axially aligned access openings 24*a* are drilled through the fins 22*a.* The fastener openings 15*a* and 19*a* are tapped for fastening bolts (not shown). Mounting holes 34*a* (FIG. 8) and mounting holes (not shown, but corresponding to the holes 44) are drilled and tapped to accommodate screws so that the intake manifold and the exhaust manifold, respectively, can be mounted on the cylinder block 10*a*. Further at the second machining station, a spark plug opening 28*a* is drilled and tapped.

The cylinder block 10*a* is moved to a third machining station (FIG. 9) where the piston chamber 26*a* is subjected to a boring operation.

Figure 10:
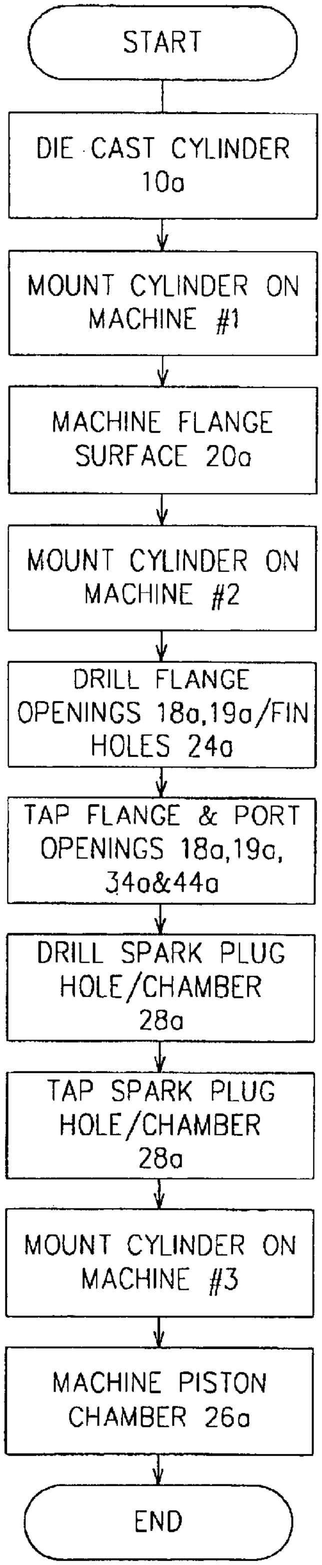
FIG. 10 PRIOR ART
FIG. 10 is a flow chart illustrating the progression of various prior art machining operations.

The sequence of the foregoing operations is illustrated in FIG. 10. It should be appreciated that even though casting costs are relatively low as a result of wide as cast tolerances, the material handling and machining costs combine to eliminate any savings in the casting operation. By requiring the die caster to hold tighter tolerances, particularly with respect to the flatness of the foot flange mating surface 20 and the fastener apertures, a net savings results, even though casting costs are relatively high.

Figure 11:
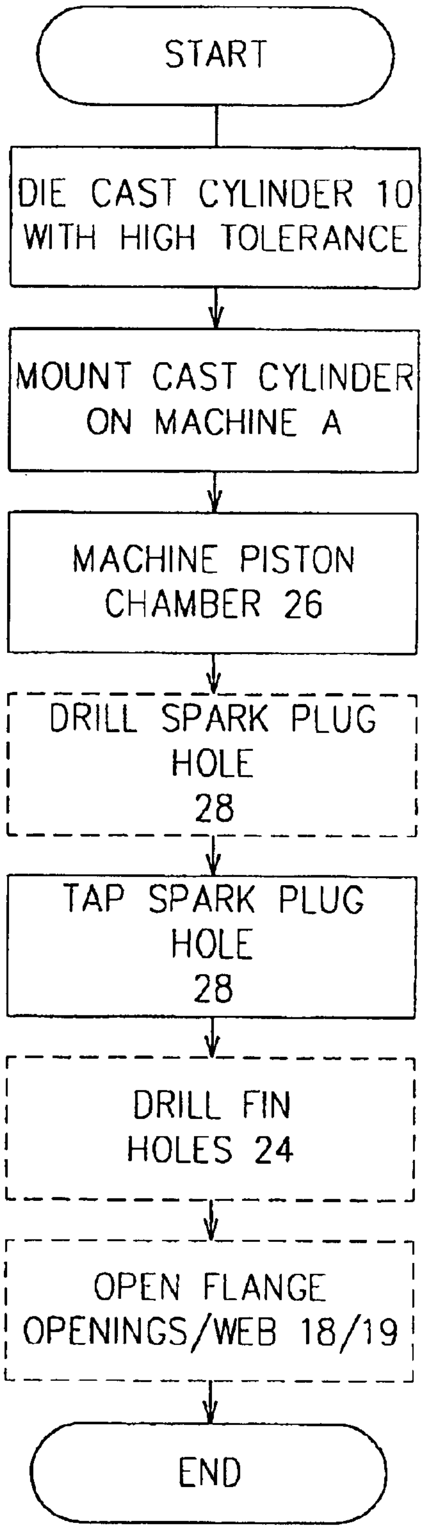
FIG. 11 is a flow chart illustrating the progression of various machining operations according to this invention.
Figure 12:
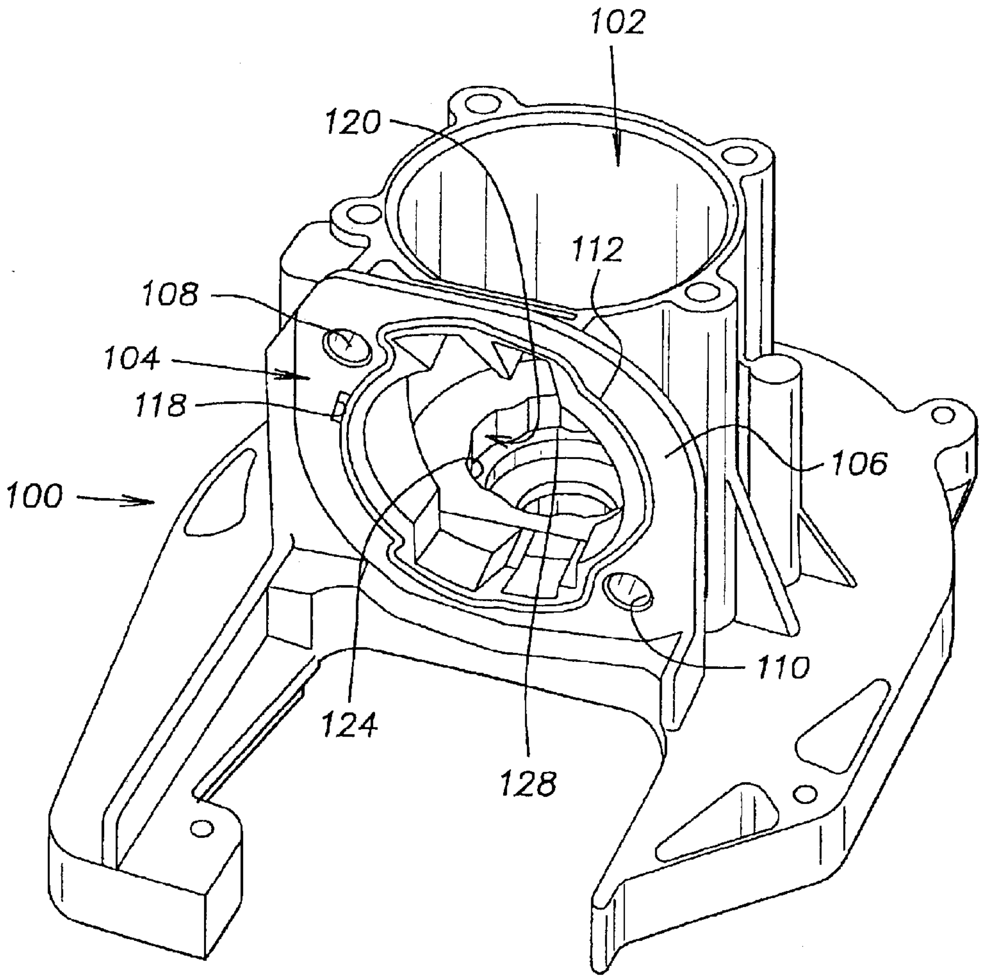
FIG. 12 is a perspective view of the crankcase according to this invention.
Figure 13:
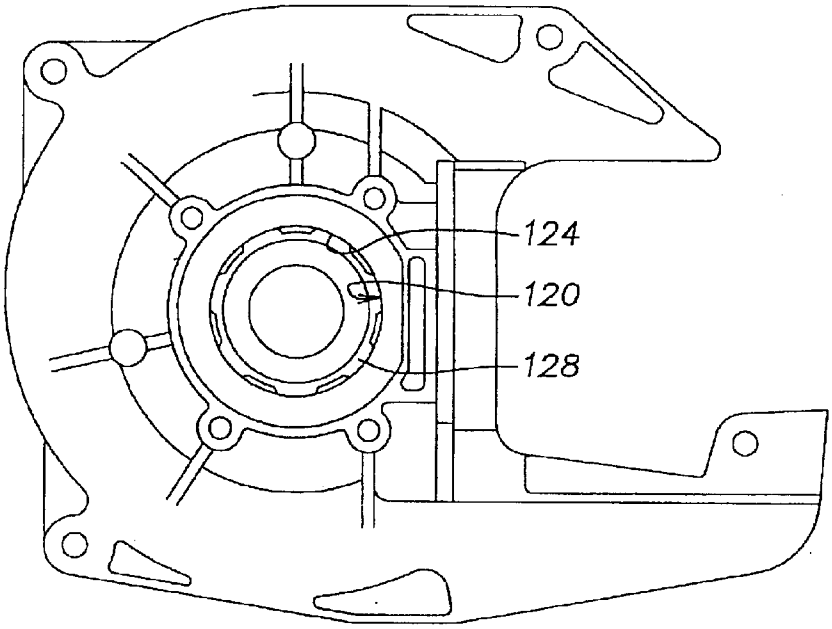
FIG. 13 is a side elevational view of the crankcase.
Figure 14:
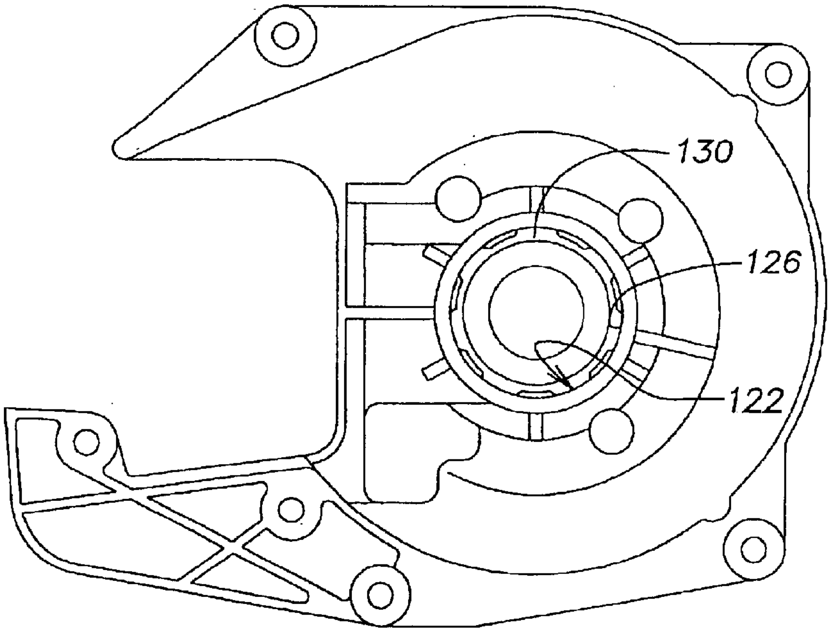
FIG. 14 is an elevational view of the other side of the crankcase.

The process according to this invention is illustrated in the flow chart of FIG. 11. Initially, a die casting is produced having tight tolerances, particularly with respect to flange flatness and surface finish as well as fastener hole diameters and the positional location of the diameters. The preferred tolerance is approximately 0.006 inch for the mounting surface 20. The perpendicularity of the fastener openings 18, 19, 34 and 44 to the surfaces 20, 36 and 46 is approximately 0.002 inch. The true positional location of the fastener openings 18, 19, 34 and 44 is approximately 0.006 inch.

The casting is positioned at a single machining station where the piston chamber 26 is subjected to a boring operation. The spark plug hole or opening 28 is drilled and tapped and the axially aligned fin openings 24 are drilled. The spark plug opening 28 is substantially formed during the molding as is indicated in phantom outline 28*b* in FIG. 5. To simplify the problem of a through core pin in the mold, a thin web of material closes off the opening 28 in the as cast condition. It is this thin web that is removed during the drilling step as indicated in FIG. 11. It is contemplated that the drilling step may be eliminated by the use of a through core pin, i.e., a core pin entering the mold surface, which forms a top side 30 of the cylinder block. Similarly, the fastener openings 18 and 19 are cast with thin webs of material 18*b* and 19*b,* which are removed by a drilling operation as indicated in FIG. 11. Further, the exhaust port 42 and the intake port 32 have as cast thin webs adjacent the cylinder chamber 26. A separate machining operation is not required since these webs are removed during the boring operation. Additionally, it is contemplated that the fin holes 24 need not be machined but may be provided in the casting. Again, casting the holes 24 requires complicated core pin placement in the mold.

Note that there has been a reduction in a number of machining steps over the prior art. By comparing FIG. 10 and FIG. 11, it can be seen that the flange surface machining step of the prior art has been eliminated, and the fifth and sixth steps are simplified, because only the fins need be drilled and the thin web 49 of the first and second openings 18 removed. Also, by utilizing self-tapping screws in the installation of the intake and exhaust manifolds onto the intake port structure 14 and exhaust port structure 12, respectively, there is no need to drill those holes as in the fifth or to tap those holes as represented by the sixth step. Further, the process is simplified by using only a single machine where three had previously been employed.

The second aspect of the invention eliminates even more machining steps by further increasing the features provided by the casting process over that disclosed for the first aspect of tile invention. The casting process of the second aspect of the invention adds the following features, in addition to those listed for the first aspect hereinabove.

The spark plug chamber 28 is cast fully open to the top side 30 of the cylinder. The fin holes 24 are formed by using pins in the die casting process. In addition, first and second openings 18 through the flange 16 are completely open, so no web 49 is formed. The tolerances on the flange surface 20 and the first and second openings are the same as those identified above in the first aspect of the invention.

By providing the aforementioned additional features during the casting process, the machining steps shown in FIG. 11 can be further reduced, so that the steps indicated by broken lines are eliminated. This leaves only the steps described by solid lines still necessary, as described below.

Referring now to FIGS. 12–19, there is illustrated a crankcase 100, which is adapted to be attached to the cylinder block 10. The crankcase 100 is cast to tight tolerances, particularly in areas that are required to be machined according to prior art practices. According to this invention, no machining operations are required and the crankcase is assembled to the cylinder block 10.

The crankcase 100 includes a crank chamber 102 into which a piston rod (not shown) extends to drive a crank (not shown), which converts the reciprocating motion of the piston rod to the drive shaft (not shown) of a powered tool such as a chainsaw. The crankcase 100 further includes a crankcase connecting flange 104 defining an opening 105 to the crank chamber 102 and having a flange mounting surface 106 provided with first and second fastener openings 108 and 110, which are adapted to be aligned with the first and second fastener openings 18 and 19, respectively, which are die-cast in the cylinder block foot flange 16. The openings 108 and 110 are also cast under the same tight tolerances as the openings 19 and 20 so that the cylinder block 10 may be assembled to the crankcase 100 by self-tapping fasteners (not shown) rather than by threaded fasteners entering machined and tapped apertures according to prior art techniques.

The crankcase 100 is cast so that its flange mounting surface 106 has an as cast flatness of about 0.006 inches. This provides a sealing surface that eliminates the prior art machining step. Elimination of the machining step on the surface 106 also eliminates the removal of the as-cast skin, which serves as a seal against leakage through the relatively porous interior of the casting.

Figure 15A:
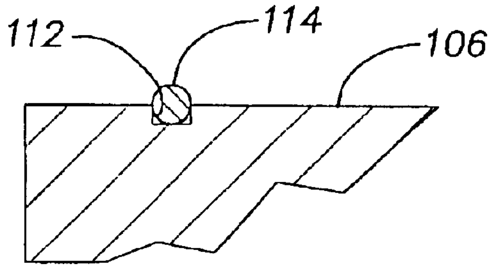
FIG. 15A is a cross-sectional view, the plane of the section being indicated by the line 15A—15A in FIG. 15.
Figure 15:
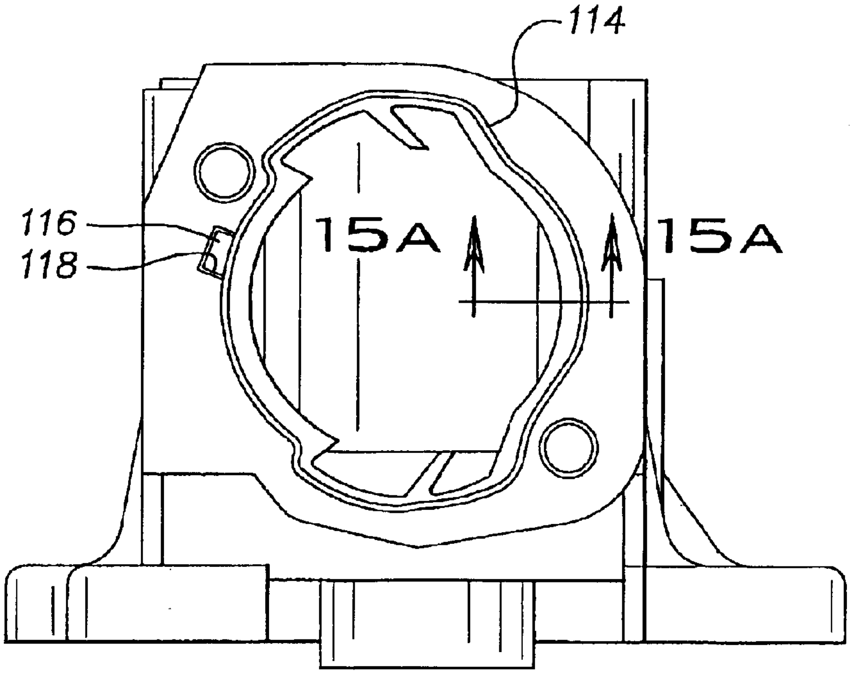
FIG. 15 is a top plan view of the crankcase.
Figure 16:
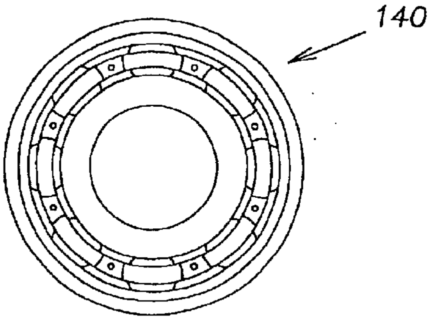
FIG. 16 is an elevational view of one of the crankshaft bearings of the invention.
Figure 17:
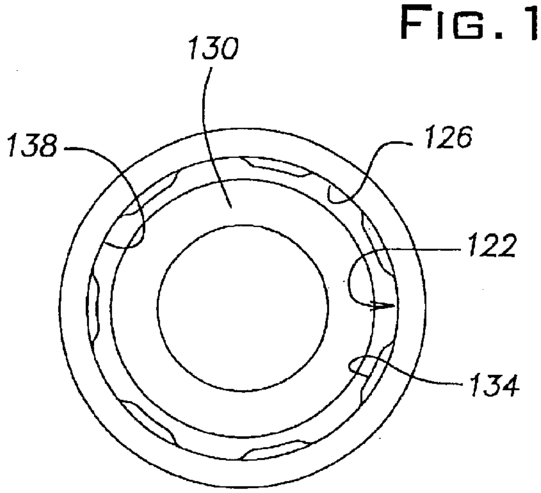
FIG. 17 is an elevational view of one side of the crankshaft portal.
Figure 18:
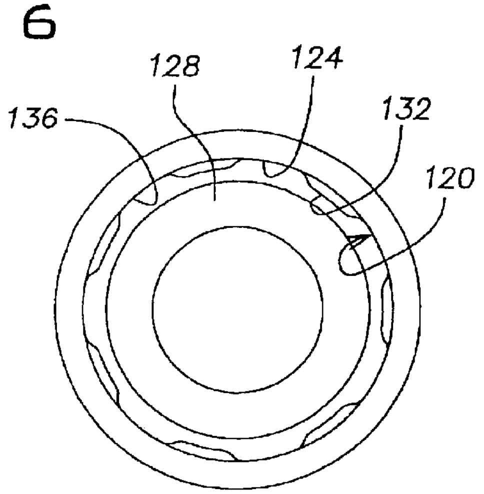
FIG. 18 is an elevational view of the other side of the crankshaft portal.
Figure 19:
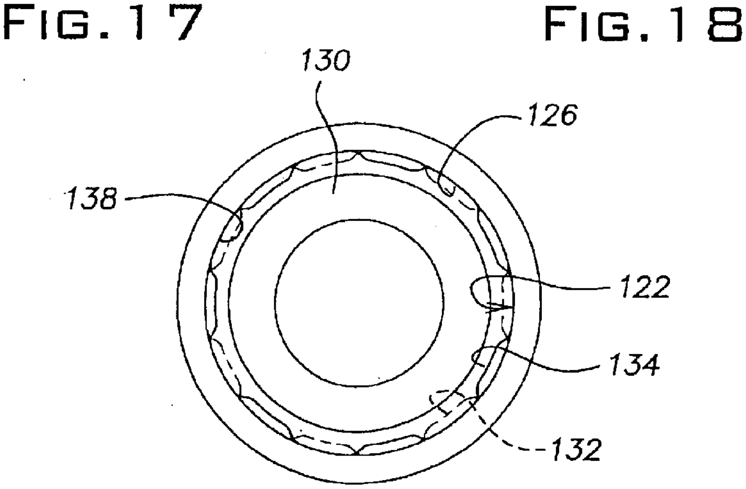
FIG. 19 is a view similar to FIG. 17 but showing the flutes on the other side of the portal in phantom outline.

A perimeter groove 112 is cast into the surface 106 and is provided with an O-ring 114 (FIGS. 15 and 15A) preformed to the outline of the groove 112. The O-ring 114 seals against the flange mounting surface 20 of the cylinder block 10 when the cylinder block 10 is assembled to the crankcase 100 as previously described. To aid in this assembly step and to retain the O-ring 114 in place during this operation, a tab 116 is provided on the O-ring 114 that is received in a notch 118.

A bearing assembly is provided for the drive shaft, which eliminates prior art machining steps in this area. Referring to FIGS. 12–14 and 16–19, first and second bearing recesses 120 and 122 are cast at one end of the crank chamber 102. Each recess 120 and 122 is defined by cylindrical sidewalls 124 and 126 and by toroidal bases 128 and 130, respectively. Each cylindrical sidewall 124 and 126 is provided with a plurality of rounded, radially inwardly directed flutes 132 and 134, respectively. The flutes 132 and 134 are evenly spaced about the sidewalls 124 and 126 and are separated by arcuate sidewall portions 136 and 138, each having an arcuate dimension corresponding to the arcuate dimension of each flute 132 and 134. As may be noted with reference to FIGS. 17–19, however, the flutes 132 and 134 are mutually offset at a distance corresponding to the aforementioned arcuate dimension.

A roller bearing 140 (FIG. 16) is press fitted into each bearing recess 120 and 122. The provision of the flutes 132 and 134 allows for radial bending to occur between the contact areas of the flutes, as opposed to circumferential stretch of the casting under a heavy press fit. Also, the flutes allow for material flow between the flutes during the pressing operation. The toroidal bases 128 and 130 form seats for the bearings 140 during the pressing operation, thus eliminating the need for machined grooves and locating clips in the drive shaft portal. The offset relationship of the flutes 132 and 134 helps to minimize noise and vibration. Also, to that end, the number of ball bearings in each bearing 140 is not equal to the number of flutes 132 or 134. In the illustrated embodiment, there are eight ball bearings in each bearing 140 and seven flutes 132 or 134 in each bearing cavity.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of manufacturing a crankcase for a small engine comprising the steps of casting a crankcase having a crankcase chamber, a first and a second bearing recess at the end of said crankcase chamber, each of said recesses being defined by a cylindrical sidewall having a plurality of rounded radially inwardly directed flutes formed thereon, and pressing a roller bearing into each recess so that the flutes in the first bearing recess are offset an arcuate distance with respect to the flutes in the second bearing recess.

2. A method of manufacturing a crankcase according to claim 1, wherein the flutes have an arcuate dimension, are evenly spaced about the cylindrical sidewalls, and are separated by arcuate sidewall portions.

3. A method of manufacturing a crankcase according to claim 2, wherein said arcuate distance corresponds to said arcuate dimension.

4. A method of manufacturing a crankcase according to claim 3, wherein the number of balls in said ball bearing do not equal the number of flutes in a bearing recess.

5. A method of manufacturing a crankcase according to claim 3, wherein the number of balls in said ball bearing are greater than the number of flutes in a bearing recess.

6. A method of manufacturing a crankcase according to claim 3, wherein there are eight balls in a ball bearing and seven flutes in a bearing recess.

7. A method of manufacturing a crankcase according to claim 1, wherein each roller bearing is pressed into each recess until it seats on a toroidal base.

* * * * *